Dec. 3, 1957     K. H. ZELLER     2,815,502
SAFETY HYDRAULIC BRAKE SYSTEM

Filed June 1, 1956     2 Sheets-Sheet 1

INVENTOR.
KARL ZELLER
BY George Spector
Agent

Dec. 3, 1957  K. H. ZELLER  2,815,502
SAFETY HYDRAULIC BRAKE SYSTEM
Filed June 1, 1956  2 Sheets-Sheet 2

INVENTOR.
KARL ZELLER
BY George Spector
Agent

United States Patent Office 2,815,502
Patented Dec. 3, 1957

2,815,502

SAFETY HYDRAULIC BRAKE SYSTEM

Karl Henrich Zeller, Newburgh, N. Y.

Application June 1, 1956, Serial No. 588,761

3 Claims. (Cl. 340—242)

This invention relates to an improved hydraulically actuated brake system for vehicles.

In the conventional hydraulic brake system, the brake cylinders are actuated by fluid under pressure transmitted from a central source commonly referred to as the master cylinder. The master cylinder comprises generally a fluid tight cylinder within which reciprocates a piston in response to the operation of the brake pedal. When the brake pedal is operated to apply the brakes, the piston is moved inward of the master cylinder causing pressure to be applied to the fluid contained therein. Consequently fluid under pressure is transmitted to the brake cylinders via small conduits causing the brake cylinders to actuate the brake linings to their operative positions. Inasmuch as each brake cylinder is in continuous communication with the master cylinder, the development of a leak in any one of the brake cylinders or the respective conduits would eventually result in the loss of most of the fluid and braking power. Thus it can be seen that a leak in a portion of the fluid system may cause disastrous accidents. In the instant invention, a system is provided which is substantially safer in that a leak in a specific portion of the system will only result in partial loss of the fluid and only a partial loss of braking power. Briefly the improved system comprises the conventional brake cylinder and connecting conduits. However, as distinguishing from the conventional system, each of the conduits that conduct fluid to the brake cylinders is connected to individual fluidly independent master cylinders, hereinafter referred to as preessure cylinders. The individual pressure cylinders include reciprocating pistons actuated simultaneously by a mechanism which is responsive to the actuation by the operator of the conventional brake pedal. Thus it is quite obvious that should a leak occur in any of the brake cylinders, related conduits or related pressure cylinders, the other components of the system would be unaffected and would continue to be operative. That is, instead of the fluid system emanating from a central source, as is conventional, this invention provides a plurality of independent fluid systems, all of the said systems being operatively responsive to the single actuations of the brake pedal. Since it is almost improbable that all of the systems would simultaneously spring a leak, it is quite evident that complete loss of braking power would probably never occur.

Another improvement incorporated in the novel systems is the provision of a dashboard indicating system disclosing by means of conveniently displayed dials, critical losses in fluid pressure occurring in any of the brake cylinders. The indicating system is actuated by an electrical circuit which is closed only when a leak occurs in the particular fluid line involved. Thus the operator is instantly informed as to the identity of the particular wheel affected, permitting him to drive the vehicle accordingly and to direct his repair efforts, without delay, to the defective portion of the fluid system.

Further improvements afforded by this invention are a central valve controlled fluid reservoir and a special pressure cylinder which provides a stop light under normal braking conditions and also under abnormal conditions when a leak has developed in the fluid system involving the said special pressure cylinder.

Consequently the primary object of this invention is the provision of a safe improved hydraulic brake system wherein the loss in hydraulic braking power in any of the wheels does not result in an unsafe condition of the brake system.

Another object of this invention is the provision of an improved brake system involving wheel brakes actuated by a plurality of fluidly independent systems whereby leakage in any one of the systems does not affect the operation of the other systems.

A further object of this invention is the provision of an indicator installed on the dashboard of a vehicle disclosing by flashing light visibly to the operator a loss of fluid pressure in a brake cylinder.

A still further object of this invention is the provision of a master cylinder for a hydraulic brake system which will operate a conventional stop light despite the development of a leak in the fluid line connected to the said master cylinder.

A still further object of this invention is the provision of a hydraulic brake system including a valve controlled fluid reservoir providing spare fluid for the system to replenish the supply in the system whenever desired.

The foregoing description and statement of objects are general in nature and merely intended to acquaint the reader with the most pertinent aspects of the invention. Further objects and details of the invention will become more apparent from the following detailed description, appended claims and attached drawings in which:

Figure 1:
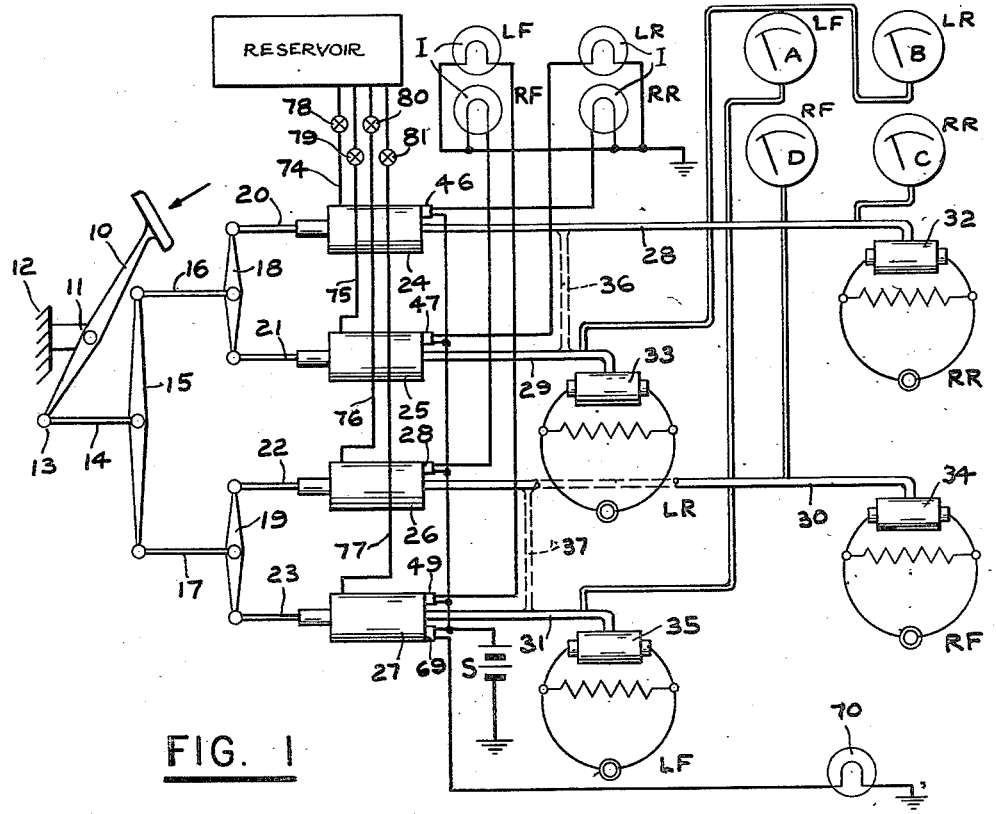
Figure 1 is a diagrammatic representation of the novel hydraulic braking system showing the functional interrelationship between the various components.

Referring to Figure 1, the novel brake organization is seen to comprise a brake pedal 10 pivoted about a fixed support 11 mounted on the chassis 12 below the floor of the vehicle. The inner end 13 of the brake pedal is swivelly attached to a link 14 which in turn is pivotally secured centrally to a cross-arm 15. A pair of bars 16 and 17 are attached at right angles to the ends of cross-arm 15, at one terminus and pivotally to pair of similar spaced cross-arms 18 and 19 at the other terminus. The lateral ends of the cross-arms 18 and 19 are each secured at right angles to the piston rods 20, 21, 22 and 23 which reciprocate snugly within the pressure cylinders 24, 25, 26 and 27 respectively. Although a specific linkage is illustrated herein for transmitting the braking movement from the pedal 10 to the various pistons, it should be understood that various push or pull linkage mechanisms can be substituted for the same purposes without affecting the inventive concept of the system.

Pressure cylinders 24, 25, 26 and 27 include internal fluid compartments which are connected via the conduits 28, 29, 30 and 31 respectively to the brake cylinders 32, 33, 34 and 35 respectively. Brake cylinder 32 actuates the brake for the wheel designated RR (right-rear). Similarly brake cylinder 33 actuates wheel LR (left-rear); brake cylinder 34 actuates wheel RF (right-front) and brake cylinder 35 actuates wheel LF (left-front). Thus it is seen that each of the wheel brake cylinders receive fluid under pressure from separate pressure cylinders and separate conduits. Leakage in any one of the four independent systems will not affect the remaining systems; thus ample braking power is always available.

Should only one of the brake fluid systems be disrupted, it is true that the remaining brake systems would tend to swerve the vehicle to one side. However, swerving to one side is by far not as hazardous as the complete loss of braking power possible in conventional systems. At least the system herein presented will stop the vehicle, whereas in the conventional system, a runaway vehicle can result. Moreover the instant invention contemplates a plurality of independent fluid systems wherein each independent system comprises two or more brake cylinders having a common pressure cylinder. For example, no invention would be involved in modifying the system of Figure 1 by interconnecting conduits 28 and 29 with conduit 36 (shown in dotted lines); and interconnecting conduits 30 and 31 with conduit 37. When so arranged leakage in either brake cylinder 34 or 35 will render the brakes for wheels LF and RF simultaneously inoperative; and leakage in brake cylinders 32 or 33 will render the brakes for wheels LR and RR simultaneously inoperative. In the latter arrangement a leak in either of the independent systems transmitting fluid to the front and rear wheels will cause a pair of wheel brakes to be inoperative. Thus either the front or rear wheels will continue to supply braking power without the swerving condition noted for the initially described systems involving independent fluid supply systems from independent pressure cylinder. In the latter system involving the interconnecting conduits 36 and 37, it is obvious that either cylinder 24 or 25 can be eliminated and either cylinder 26 or 27 can be eliminated if desired.

Although four wheel units are herein described, the fluid distribution system is obviously applicable to vehicles involving six, eight, etc., wheels.

Figure 3:
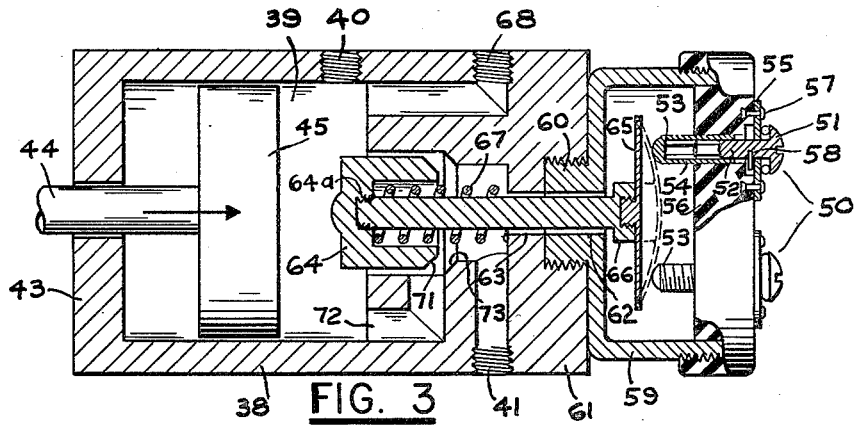
Figure 3 is a sectional view of a special pressure cylinder which includes means for operating a stop light in addition to other structures included in the other pressure cylinders depicted in Figure 4.
Figure 4:
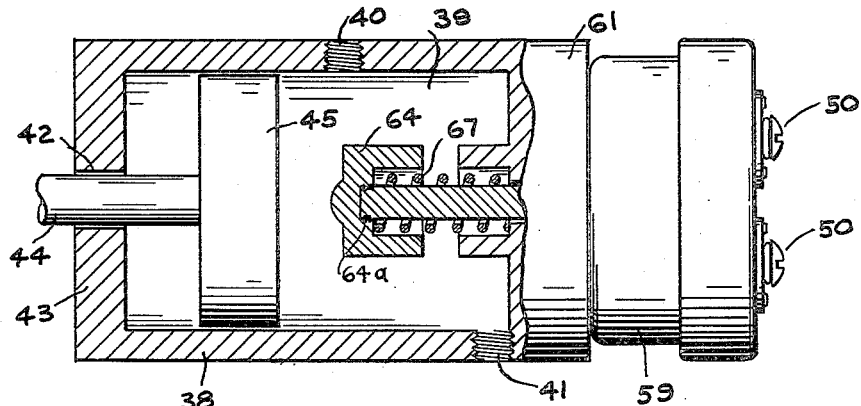
Figure 4 is a sectional view of a regular pressure cylinder adapted to actuate a pressure loss indicator and to distribute fluid under pressure to the related brake cylinder.

For a detailed description of the various pressure cylinder, attention is directed to Figures 3 and 4. Pressure cylinders 24, 25 and 26, which are all identical, are depicted by Figure 4. Figure 3 on the other hand depicts pressure cylinder 27, which includes structure for actuating a stop light. Referring now to Figure 4, the standard pressure cylinder is seen to comprise a cylindrical housing 38 having a fluid compartment 39, an inlet 40 for filling purposes and an outlet 41 adapted for connection with one of the conduits 28, 29 or 30. An aperture 42 is provided through end wall 43 to receive in fluid tight reciprocable fashion one of the piston rods 20, 21 or 22 represented in Figure 4 by numeral 44. The means for reciprocally mounting the rod 44 in a fluid tight manner through the aperture 42 is conventional as shown for example in the patent to White (2,134,902), and consequently is not detailed here. A piston head 45 is secured transversely to the end of rod 44 and is dimensioned to reciprocate snugly within the walls of compartment 39. Thus actuation of pedal 10 causes the linkage comprising parts 14, 15, 16, 17, 18 and 19 to move the piston head 45 inwardly of housing 38. Such inward movement, creates a pressure on the fluid in compartment 39, thereby expelling fluid under pressure through outlet 41, the attached conduit and finally to the related brake cylinder; each of the pressure cylinders being so actuated by the operation of pedal 10.

However should one of the conduits or related brake cylinders spring a leak, the piston which is forcing fluid through the leaking member will be driven further inward to close an electric circuit which actuates a dial on the vehicle dashboard indicating that one of the brakes has become inoperative.

Referring again to Figure 1, it is seen that the cylinders 24 through 27 include electric terminals 46, 47, 48 and 49. Each of these terminals have one post connected to an electrically actuated indicator "I" mounted visibly on the dashboard and the other post is connected to a source of current S. The source of current is in turn grounded to the vehicle chassis and the indicators I are also grounded to the chassis. The indicators to which the cylinders are electrically connected are identified by the wheel location they are related to. For example, cylinder 24 is connected to wheel RR (right-rear); thus the indicator I which connects with the terminals of cylinder 24 also bears the identifying symbol RR. Cylinders 25, 26 and 27 are similarly related to indicators marked LR, RF and LF respectively.

The terminals 46 through 49 which are better seen in Figure 3 are normally in an open circuit condition, i. e., the circuit operating the indicators is not completed at the terminals. Completion of the circuit and actuation of the indicators can only be accomplished by completing the circuit at the terminals as will be now disclosed.

Referring to Figure 3, each of the terminals is seen to comprise a pair of similar posts 50 having a head 51 and a rectangular stem 52, slidably disposed in a hollow externally threaded stud 53. The stud 53 includes longitudinal diametrically opposite grooves 54 in which the stem 52 reciprocates. The said grooves prevent the stud from rotating relative to the stud. A washer 55 is placed between a collar insulator 56 and the head 51 and is secured to the collar by means of screws 57. The stem 52 also includes a projection 58 which abuts the washer 55. Thus the posts 50 are restrained from moving axially relative to the collar 56. Rotation of the head 51 by means of a screw driver or the like will cause the stud 53, to reciprocate axially relative to the collar due to the external stud threads. Consequently the inward projection of the stud is adjustable for reasons to be disclosed. The inner ends of studs 53 are spaced thereby causing the electric circuit to be incomplete. Thus in the normal condition the indicators are inoperative signifying that all of the brakes are operative.

The terminals described in connection with Figure 3 are duplicated in Figure 4, hence the details are not shown in Figure 4. The collar insulator of Figures 3 and 4 are press fitted within a bonnet 59 which includes an inner reduced axial projection 60 threadedly secured to the outer wall 61 of the cylinder housing 38. Both the projection 60 and wall 61 includes axial aligned apertures 62 and 63 through which is reciprocally mounted a spring biased switch actuator 64. The outer end of the actuator 64 includes a flexible plate 65 threadedly secured to the actuator by means of a threaded hub 66. A spring 67 biases the actuator to a position wherein the plate 65 is spaced from the ends of the studs 53. In Figure 4, the plate 65 is similarly biased to a position spaced from the stud ends. The inner end of actuator 64 is removably mounted at 64a.

The functioning of cylinders 24, 25, 26 and 27 can be better understood by referring now to Figure 4. Should a leak occur in the conduit or brake cylinder connected to outlet 41, pressure in compartment 39 will drop. Further actuation of the brake pedal will cause the piston head 45 to move further inward to contact and force actuator 64 toward the terminal posts 50. Should the leak be appreciable the plate 65 (see Figure 3) will engage the studs 53 completing the circuit and causing the indicator involved to emit a visible signal. The operator will immediately be able to ascertain which wheel (or pair of wheels) is involved.

The more complex structure of the cylinder of Figure 3 is necessitated by the provision of additional means for operating a stop light. All of the components bearing the same reference numeral as those in Figure 4 are of similar construction. In addition there is provided a third threaded opening 68 adapted to receive a pressure responsive diaphragm switch 69 (see Figure 1). As shown in Figure 1 the switch 69 is secured to cylinder 27 and is electrically connected to the source of current S and to the stop light 70 which is grounded. Completion of this latter circuit at switch 69 will cause the actuation of the stop light. The details of the switch 69 are not disclosed herein as such details are conventional and not germane to this invention. The reader is referred to the patent to White (2,134,902) for the specific structure of this switch. Suffice to say, that the switch is actuated to the operative position closing the circuit upon the generation within compartment 39 of a pressure of sufficient magnitude to operate the related brake cylinder. In the cylinder of Figure 3, the actuator 64 includes a conical valve head surface 71 which is adapted to prevent communication between the channel 72 and the outlet 41, when the surface 71 is in sealing contact with a conical valve seat 73. Normally channel 72 communicates with outlet 41 to provide brake fluid to the brake cylinder. The pressure generated in compartment 39 when the piston head 45 is actuated being sufficient to actuate the stop light switch mounted in opening 68. When a leak occurs downstream of outlet 41, the pressure in compartment 39 does not build up suffiiciently to retard the movement of piston head 45. Thus the piston head moves further inward until actuator 64 is engaged. Until the actuator 64 is engaged there is insufficient pressure to actuate the stop light switch via opening 68. Upon further movement of 45, the actuator 64 is driven forward until the plate 65 engages studs 53 thereby actuating the signal indicator on the dashboard to notify the operator that one of his wheel brake systems is defective. During the forward movement of actuator 64, it is to be noted that valve head 71 approaches seat 73 thereby gradually diminishing the quantity of fluid expelled through outlet 41. In addition to decreasing the quantity of brake fluid lost in the defective line downstream of outlet 41, the gradual closing of channel 72 causes an increase in pressure in compartment 39. The increase in pressure in the compartment 39 may be sufficient to actuate the stop light switch at opening 68. Should the pressure drop at 41 be sufficient the actuator 64 will move sufficiently to cause valve head 71 to seal against the seat 73 thereby preventing further egress and loss of fluid through outlet 41 and simultaneously generate adequate pressure in compartment 39 to operate the stop light switch mounted in opening 68. Thus it is evident that, despote the existence of a leak in the system between the pressure cylinder and the brake cylinder, the stop light will be operative for a limited time. Since the operator has been informed of the leak via the indicator on his dashboard, he can make the necessary repairs before all the fluid in the defective line has been lost and the stop light has become completely inoperative. It is further to be noted that leaks in the systems controlled by cylinders 24, 25 and 26 will not affect the stop light at all. Consequently an almost uninterrupted stop light action is guaranteed with this arrangement. In conventional systems, utilizing one master cylinder, a leak occurring in any of the brake cylinders or conduits results in complete loss of braking power in addition to the faulty operation of the stop light.

Figure 2:
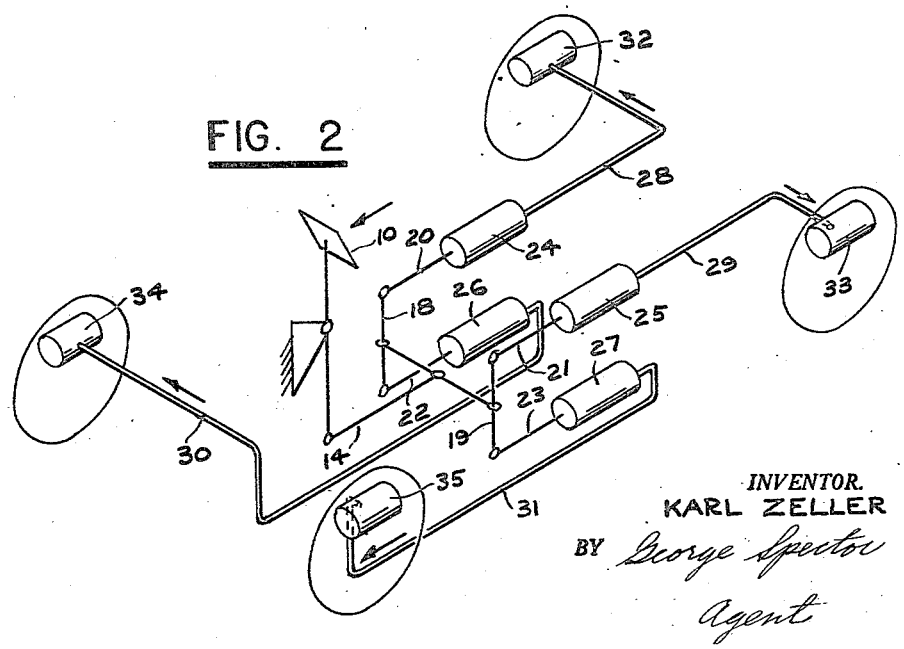
Figure 2 is a perspective schematic layout of the independent fluid systems in relation to the conventional vehicular wheel arrangement.

Although, as depicted in Figure 2, the various pressure cylinders are shown as being independently mounted, it is emphasized that they can all be mounted in an integral housing for the purposes of compactness at any convenient location on the chassis.

Further advantages are provided by this invention in the making of repairs. Firstly, the operator knows exactly which line is defective thereby eliminating time wasting investigations. Moreover each line can be repaired independently without affecting the others.

As an additional safeguard the system also includes a series of pressure gages A, B, C and D respectively connected to the conduits 31, 29, 28 and 30.

Whereas the indicator "I" will notify the operator of fluid leakage only when the brake pedal is actuated, the pressure gages will indicate such abnormalities without the actuation of the brake pedal. Should the electric circuit actuating indicators "I" become defective for some reason, the gages A, B, C and D provide alternate warning means. However the indicators are the prime means for such warning signal since they emit a flashing light which can't be overlooked.

The pressure cylinders are filled via a reservoir (Figure 1) which is connected to the cylinders by conduits 74, 75, 76 and 77. Each of these latter conduits include valves 78, 69, 80 and 81 respectively. The reservoir is located conveniently under the hood or dashboard. Thus to replenish the supply in any of the pressure cylinders, the respective valve is opened and fluid flows to the cylinder by gravity. As noted in Figures 3 and 4, inlets 40 are provided for communicating with conduits 74 through 77.

Figure 5:
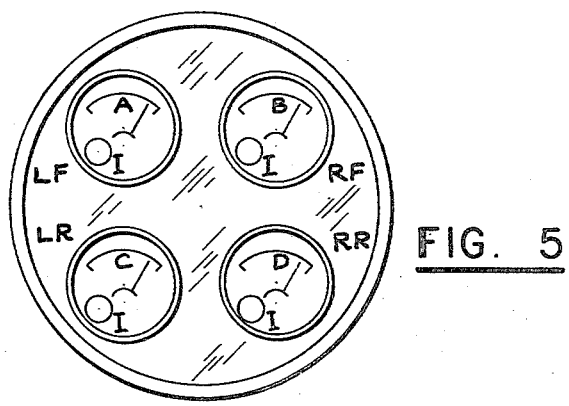
Figure 5 is a front view of an indicating gage for notifying the operator which wheel brake system is defective.

In Figure 5 a preferred dial arrangement is depicted for the indicators "I" and the gages A, B, C and D. The assembly is mounted conveniently on the dashboard. The indicating lights are located on the gages A, B, C and D. Thus the same wheel designations (LF, RF, LR, RR) are used for the dual indicating system.

It is now apparent the instant invention provides a brake system which:

(1) Affords ample braking power despite the development of a leak in any of the compartments distributing fluid to the brake cylinders.

(2) Will immediately notify the operator of the existence of a leak.

(3) Will operate a stop light at all times.

(4) Will facilitate the refilling of a pressure cylinder whose supply of fluid has been depleted.

(5) Will expedite and facilitate repairs to the systems.

These advantages will result in greater safety without any appreciable increase in the costs of installation.

Having thus described in detail the nature of the invention, a grant of Letters Patent is desired for the novelty herein disclosed and as defined in the following claims:

1. A hydraulic brake system for vehicles comprising a plurality of brake cylinders and a similar number of pressure cylinders, each brake cylinder being connected to a corresponding pressure cylinder with a conduit, in combination with a piston mounted snugly within each pressure cylinder whereby movement of the pistons in one direction causes an increase in the pressure of the fluid in the cylinders in further combination with a linkage mechanism connected to all of the said pistons whereby actuation of the mechanism causes motion of the pistons in the said one direction, each pressure cylinder comprising an internal chamber one side of which is bounded by the said piston and the opposite side is in communication with an outlet connected to one of the said conduits, including electric terminals connected electrically to an indicator and a rod having means for contacting simultaneously the said terminals to complete the circuit, said rod being mounted movably in the pressure cylinder with one end facing the said piston and the other end including the said means opposite the terminals, said piston being movable to engage the rod should the pressure drop in the chamber during piston actuation, said engagement driving the rod towards the terminals, whereby pressure in said chamber below a specific minimum causes the said means to complete the circuit and actuate the indicator, one of said pressure cylinders including a second outlet in communication with the chamber and a stop light mechanism, the latter said cylinder also including means responsive to a pressure drop in the chamber for restricting flow to the first said outlet whereby further piston actuation causes the pressure in the chamber to increase sufficiently to actuate the said stop-light mechanism after the indicator has been actuated.

2. A system as in claim 1 wherein the second said means comprises a valve head secured to the first said rod end and the chamber includes a valve seat between the first said outlet and the piston whereby continued forward motion of the piston drives the valve head towards the valve seat to constrict flow therethru.

3. A system as in claim 1 wherein the first said means is a resilient conductor adapted to flex when it is in contact with the terminals whereby further movement of the rod is obtained subsequent to completion of the circuit at the said terminals.

References Cited in the file of this patent

UNITED STATES PATENTS

| | | |
|---|---|---|
| 2,085,173 | Stansbury | June 29, 1937 |
| 2,332,301 | Cox | Oct. 19, 1943 |
| 2,617,901 | Madesen | Nov. 11, 1952 |
| 2,694,191 | Falanga et al. | Nov. 9, 1954 |